United States Patent

Marti Sala

[11] Patent Number: 6,116,406
[45] Date of Patent: *Sep. 12, 2000

[54] AUTOMATED UNIT FOR THE UNSCRAMBLING AND LINED UP DELIVERY OF ARTICLES

[76] Inventor: Jaime Marti Sala, Emancipación 8, Barcelona, Spain

[*] Notice: This patent issued on a continued prosecution application filed under 37 CFR 1.53(d), and is subject to the twenty year patent term provisions of 35 U.S.C. 154(a)(2).

[21] Appl. No.: 09/017,211

[22] Filed: Feb. 2, 1998

[30] Foreign Application Priority Data

Jan. 31, 1997 [ES] Spain ........................... 9700197
Jan. 27, 1998 [ES] Spain ........................... 9800145

[51] Int. Cl.7 .......................... B65G 47/24; B65G 17/32; B65G 29/00
[52] U.S. Cl. ..................... 198/395; 198/397.05; 198/400
[58] Field of Search ................. 198/397.02, 397.05, 198/400, 395

[56] References Cited

U.S. PATENT DOCUMENTS

| | | | |
|---|---|---|---|
| 3,295,659 | 1/1967 | Aidlin | 198/3 |
| 3,650,368 | 3/1972 | Nalbach | 198/33 |
| 4,130,194 | 12/1978 | Schindel et al. | 198/397 |
| 4,530,430 | 7/1985 | Peterlini | 198/395 |
| 4,854,442 | 8/1989 | Krooss | 198/400 |
| 4,949,834 | 8/1990 | Schindel | 198/392 |
| 4,979,607 | 12/1990 | Fogg | 198/392 X |
| 5,415,322 | 5/1995 | Sala | 221/169 |
| 5,549,189 | 8/1996 | Martisala | 198/380 X |

FOREIGN PATENT DOCUMENTS

| | | |
|---|---|---|
| 0242214 | 10/1987 | European Pat. Off. . |
| 0578602 | 1/1994 | European Pat. Off. . |
| 8205702 | 1/1981 | Spain . |
| 8203775 | 6/1981 | Spain . |

*Primary Examiner*—Christopher P. Ellis
*Assistant Examiner*—Kenneth W. Bower
*Attorney, Agent, or Firm*—Jacobson, Price, Holman & Stern, PLLC

[57] ABSTRACT

An automated unit for the unscrambling and lined up delivery of articles including a plurality of adjacent compartments attached to the periphery of a rotary disk in motion below a gap provided in the peripheral edge of a bottom of a hopper. Each compartment is provided to receive a single article in a lying position. Below each compartment a discharge chute is provided traveling together therewith so as to receive the articles as they fall to subsequent transfer the articles in a lined up arrangement onto an out feed conveyor. A member is incorporated in each compartment for temporarily holding articles therein. The member is selectively tilted upon a signal being received from a sensor to thus drop articles in a conveniently oriented position into the discharge chutes.

14 Claims, 5 Drawing Sheets

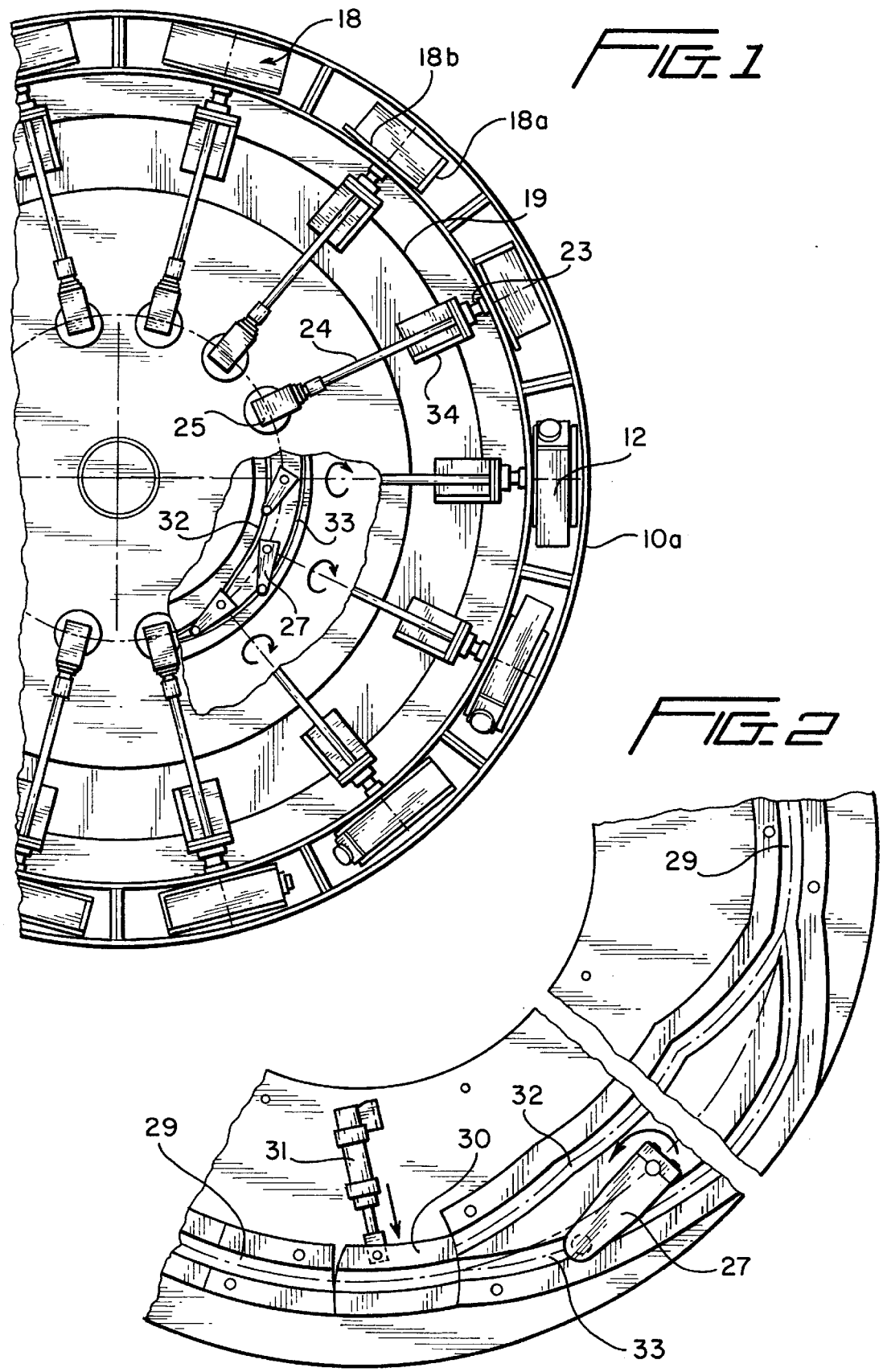

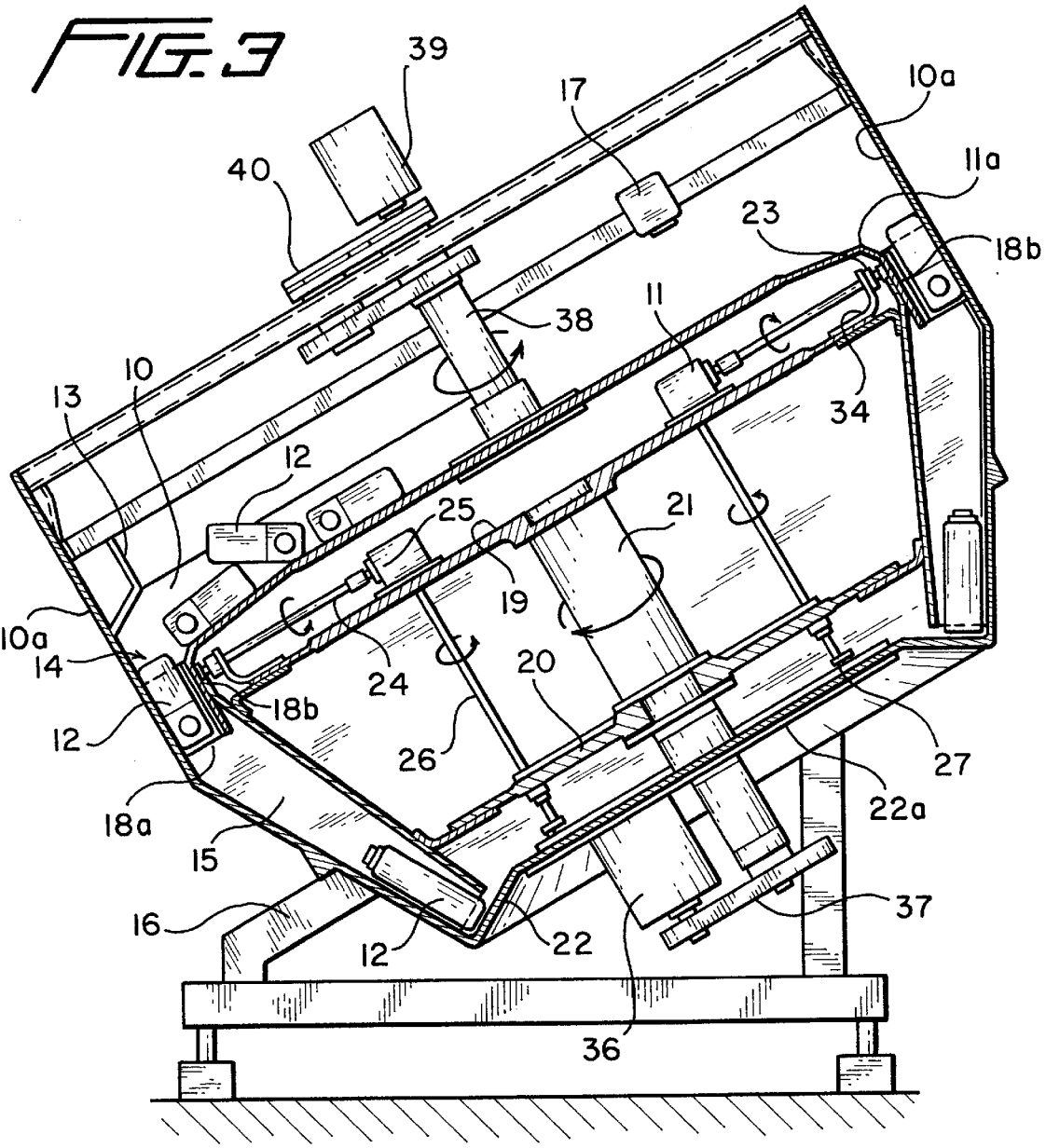
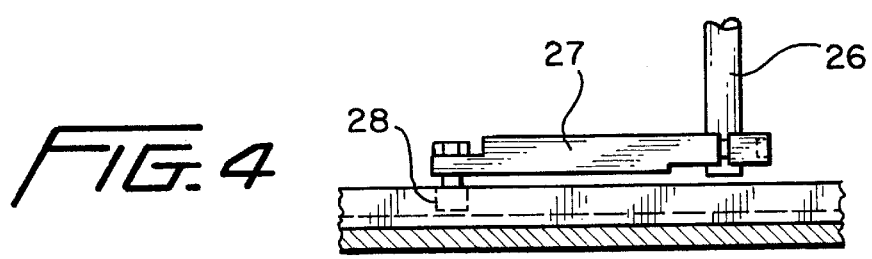

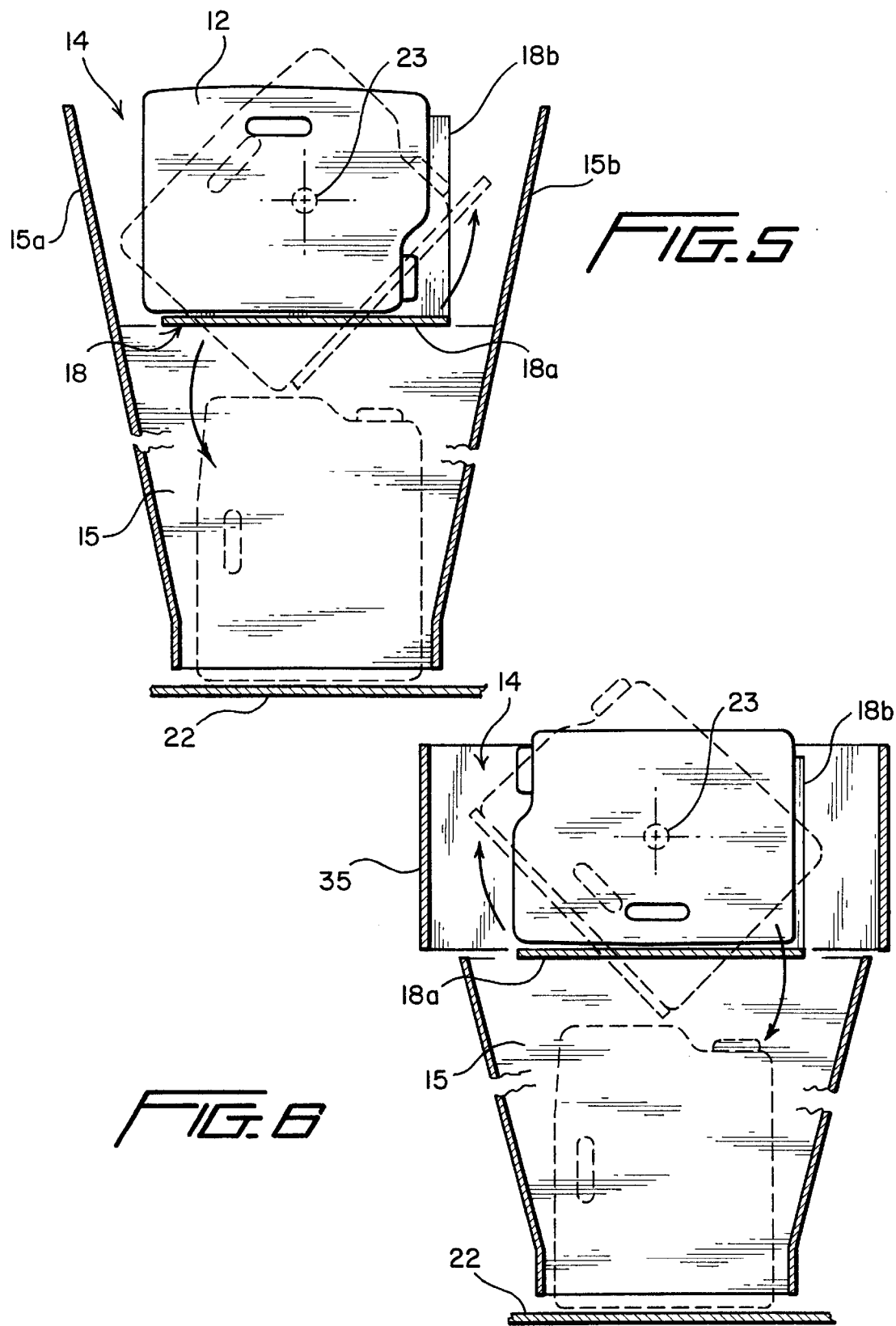

AUTOMATED UNIT FOR THE UNSCRAMBLING AND LINED UP DELIVERY OF ARTICLES

OBJECT OF THE INVENTION

The present invention concerns an automated unit for the unscrambling and lined up delivery of articles which is specially applicable to the upright positioning of empty containers or lightweight objects of various configurations and is apt to continuously feed a filling station or the like.

The unit in question comprises an upperly open hopper which is apt to receive the containers in bulk and has a flat bottom that is a preferably moving member in order to thus shake or stir the containers and has a peripheral edge that is spaced apart from the lateral wall of said hopper and determines a gap through which the containers can pass, comprising a plurality of compartments traveling along a closed circuit below said peripheral edge, and each allowing to receive in a lying position a single container to be oriented, and having an open bottom through which the containers can pass, there being besides a discharge chute associated to each of said compartments and traveling together with them so as to thus receive said containers that are thus oriented as they fall, and for an ulterior transfer of said containers in a lined up arrangement onto an out feed conveyor.

BACKGROUND OF THE INVENTION

A unit of this kind is known from the European patent EP-A-0578602, issued to the applicant, wherein a principle is used for the upright positioning of the containers which is known from the U.S. Pat. No. 3 295 659 and is based on a circling of the containers arranged in a lying position inside peripheral cavities in such a way that the container body is supported by a stationary annular shelf interposed between the open bottom of said compartments and said discharge chutes, the neck of the container being held by holding members provided next to the bottom of said moving compartments. The orientation in an upright position is achieved by means of providing an interruption in said stationary annular shelf supporting the container body, this determining the falling of the container into the corresponding discharge chute with its bottom first since regardless of the position of the container in the compartment its neck or upper filling part is being held by said holding members.

This orientation system presents nevertheless the drawback that at the beginning of the positioning there is always a critical transfer from a stationary support, i.e. the abovementioned annular shelf, into a moving part, i.e. the aforesaid discharge chutes, with the risk that during said transfer and due to the light weight of the containers, to the possible irregularities of the latter, etc. jams might possibly occur, with the consequent damage to the containers and undesired shutdowns of the unit.

A second drawback related to the precited upright positioning technique derives from the limitation imposed by said structure since it needs a specific area where the positioning of the containers has to take place as they fall, this having to occur at a point sufficiently distant from the loading area, which in some units has required to split the falling process in two parts in order to give the containers the time needed for them to reach the bottom of the discharge chutes to thereupon be driven on a stationary flor up to an out feed conveyor; see for example patent U.S. Pat. No. 3,650,368 and U.S. Pat. No. 4,130,194, this latter comprising peripheral cavities to hold the containers.

From patent U.S. Pat. No. 4,949,834 is on the other hand known a unit whose general characteristics are equivalent to those of the aforementioned patent U.S. Pat. No. 4,130,194 but wherein although the positioning of the containers is equally achieved by means of a transfer from a slidingly resting position on a stationary annular shelf into a moving part formed by the discharge chutes elements associated to said discharge chutes have been provided which in the absence of said stationary shelf give an ulterior support to a preestablished part of the container, in such a way that the upright positioning of the latter is produced and completed as it falls into the discharge chute.

For such a purpose an automated positioning of said supporting element has been provided by means of using means for recognizing the previous position adopted by the containers inside said peripheral cavities, said elements being actuated as dictated by said previous position as per a conventional technique used in the field of the conveying and storing of goods and described, for example, in the publications of prior art: ES-A-8203775, ES-8205702 and EP-A-0242214, for similar applications.

Although the solution described in the aforesaid patent U.S. Pat. No. 4,949,834 allows to employ peripheral cavities of big dimensions allowing to process containers of various shapes and sizes, the technical doctrine described in said patent does still present the drawbacks deriving from the aforementioned positioning/orienting principle, i.e. the transfer takes place from a slidingly resting position on a stationary part into a moving part, with the added drawback that the supporting means aiding the positioning are precisely provided in said moving part, this resulting in the fact that although it is possible to achieve a correct automated positioning of said supporting elements there is an evident risk that the proper positioning of the containers cannot be finally attained. Said supporting elements have to be besides returned to their starting position by means of using stationary and moving stops, which implies a considerable mechanical complexity. The use of stops entails besides the generation of noises, and their effect upon the return to origin can generate overstresses and errors.

Due besides to the fact that the support is formed in the aforementioned discharge chutes it is not possible to proceed to an eventual change of said discharge chutes as could be necessary when the unit is used to process containers of very different shapes or sizes.

Besides, the use of a stationary supporting shelf interposed which when interrupted provides the fall of the containers impose the limitation that the unloading of the machine should be done in a fixed zone.

SUMMARY OF THE INVENTION

The present invention seeks to obviate the aforementioned drawbacks, and for such a purpose an upright positioning/orienting system has been provided which has a different conception and consists in employing compartments for example like those of patent EP-A-0 578 602 or even simpler which have been provided with a member for temporarily holding the containers, in such a way that once having the containers been received in said compartments said holding member is tilted at a given point in time in order to thus directly drop the containers into the discharge chutes as per the desired orientation. The aforementioned stationary annular shelf has been hence omitted, and the containers are now transferred from a moving element, i.e. the compartment (where they are being temporarily held by the aforesaid holding member), into another moving element, i.e. the discharge chute situated directly below, into which they fall once having been conveniently oriented.

In order to conveniently tilt the aforementioned temporary holding member a detection of the previous position adopted by the containers in the compartments is made use of by means of an optical visualisation device (one or more sensors) and auxiliary circuitry for processing the signal which is apt to generate an opportune control output signal as per a conventional technique used in the field of the conveying or storage of goods as previously cited.

In a first embodiment said temporary holding member consist in a flat forming the bottom of the compartment and rotatable at its central part around a cross shaft, said flat being selectively tiltable to either side as a result of a rotation of said shaft in the proper direction as dictated by the previous position of the article in the compartment.

In order to bring about said rotation there is a set of first rods linked to said shaft and second rods ending in a lever in its turn ending in a roller traveling inside a main guide-path (for example a groove), means having been provided for switching said roller into either of the intermediary guide-path lengths of different course intercalated in said guide-path, this determining the rotation of a corresponding rod in either direction, said rotation being then transmitted through a gearing to the other rod connected to said shaft.

Alternatively said temporary holding member can comprise two planes articulated by one end to the opposite edges of the bottom of a compartment.

Other characteristics and the advantages of the invention will become more apparent when reading the following description of an exemplary embodiment given only by way of a merely illustrative and nonlimiting example of the object of the invention.

BRIEF DESCRIPTION OF THE DRAWINGS

In the drawings annexed to this description:

FIG. 1 is a partial plan-view of the unit taken from below the flat bottom on which the articles and in particular the containers accumulate at random, with a cutaway portion showing another flat situated farther down on which have been provided the above-mentioned guide-paths along which the aforesaid rollers travel;

FIG. 2 is a view at a very enlarged scale of said guide-paths along which said rollers travel, showing the detail of the section for the switching from a main guide-path of circular course into either of two auxiliary lengths of smaller and bigger radius respectively, said switching bringing about a rotation whose angular value is then transmitted and increased to thus give rise to the tilting motion of the aforementioned means for temporarily holding the articles;

FIG. 3 corresponds to a sectional elevation of the unit in question;

FIG. 4 is an elevational detail view of the lower end of a vertical rod, the orthogonal end lever arranged at said end, and the roller that travels along the guide-paths shown in FIGS. 1 and 2;

FIGS. 5 and 6 are each a conventional elevational view showing an upper member provided to hold the articles inside a compartment and the corresponding lower discharge chute, both traveling together in a closed circuit, illustrating the upright positioning principle by means of a transfer of the articles from one into the other moving element by tilting said upper member to either side with respect to an axis transversally crossing the compartment, thereby dropping the article in a properly oriented position into the lower discharge chute;

in FIG. 5 the end sides of the compartment are formed by upward extensions of the flanks of the discharge chutes, whereas in FIG. 6 the compartments are similar to those described in the aforementioned patent EP-A-0578602, a plate of L-shaped cross-section having been in both cases provided to delimit the bottom of the compartment;

DETAILED DESCRIPTION

Figure 7:
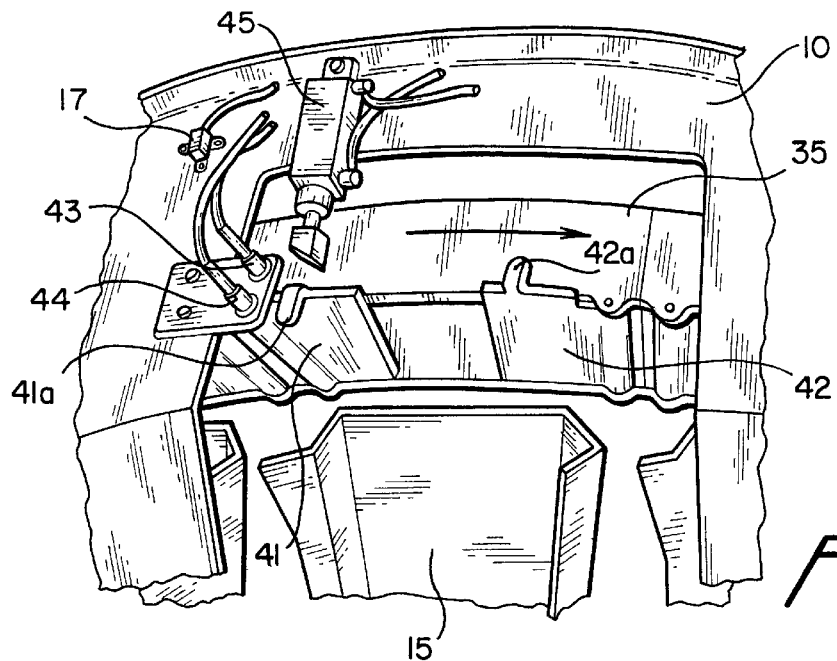
in FIGS. 7 to 12 alternative means for temporary holding the containers inside the compartments are illustrated, comprising two planes, each of them articulated by one of its edges to opposite ends of the bottom of the compartment, closing, at least in part, said bottom, each of said planes capable of pivoting while the other plane remains immobile, even though it would be possible that both of said planes being opened.
Figure 11:
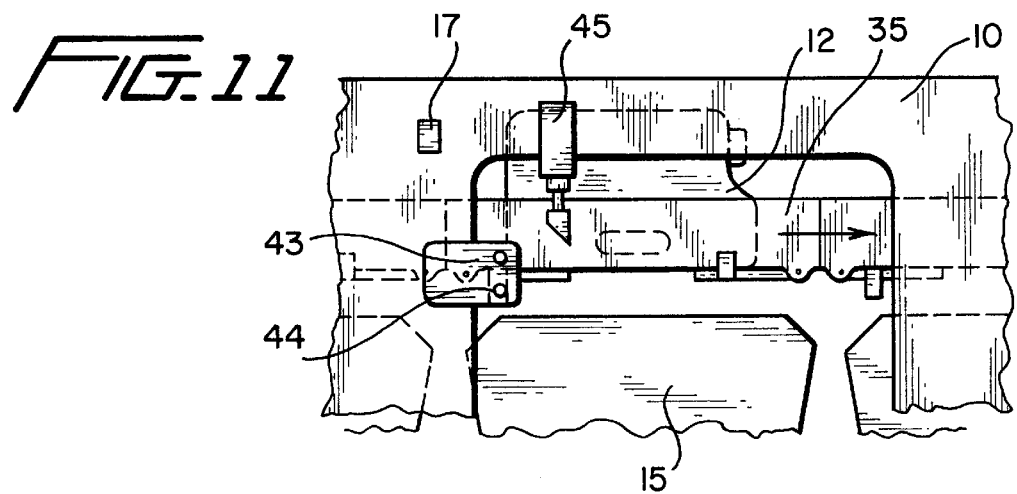
Figure 12:
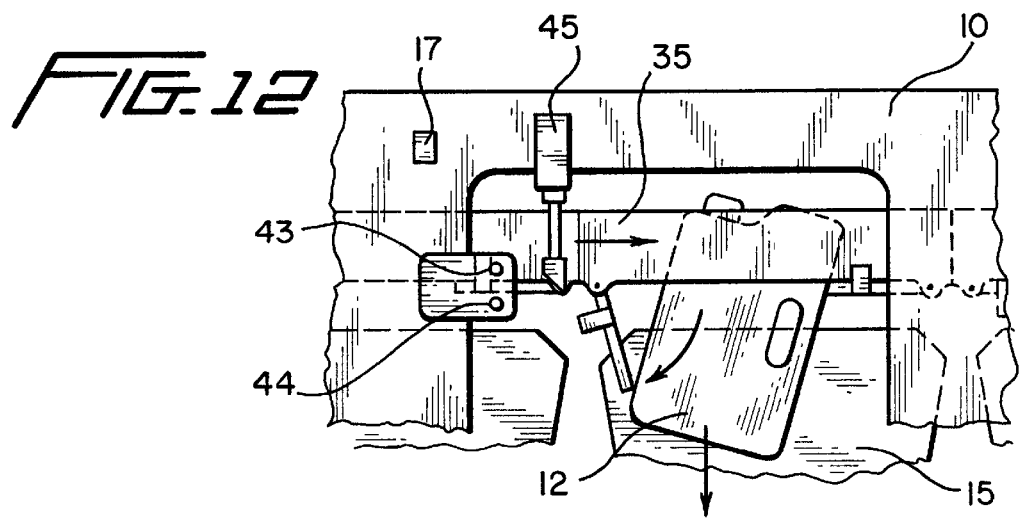

Referring to FIGS. 1 and 3 of the above-mentioned drawings, the automated unit for the unscrambling and lined up delivery of articles being proposed, of special application to empty containers or other lightweight bodies, hereinafter called "containers", of various configurations, comprises the following basic elements:

an upperly open hopper 10 resting on a supporting frame 16 allowing to load the articles in bulk, with an inclined and moving flat bottom 11 on which the containers accumulate at random (see FIG. 3), said bottom 11 having a peripheral edge 11a spaced apart from lateral wall 10a of hopper 10 in order to thus define a gap through which containers 12 can pass;

a plurality of adjacent compartments 14 attached to the periphery of a disk 19 below said peripheral edge 11a of said bottom 11, each provided to loosely receive a single container 12 in a lying position;

a discharge chute 15 arranged bellow each compartment 14 and traveling together with the latter to receive the containers 12 as they are positioned as they fall, and for an ulterior transfer of said articles in a lined up arrangement onto an out feed conveyor not having been represented but whose materialisation can be appreciated in the aforementioned patent EP-A-0578602, in its FIG. 11;

means (for example a visualisation device 17) for recognising the position adopted by the containers 12 inside said compartments 14; and a member 18 for temporarily holding the articles which is incorporated in each of said compartments 14 and is selectively tiltable by virtue of the actuation of driving means governed by a signal received from the aforementioned recognition means in order to thus drop containers 12 in a conveniently oriented position into said discharge chutes 15.

FIGS. 5 and 6 illustrate the above-mentioned positioning principle, showing that the upright positioning of a container 12 is achieved, regardless of its previous position in the compartment, by tilting member 18 to either side thus directly dropping said containers from the moving compartment 14 into the corresponding moving discharge chute 15 (elements 14 and 15 are both solid with the set of disks 19, 20 attached to rotary shaft 21 (see FIG. 3) driven by a motor 36 and transmission 37.

The motion of the aforementioned flat bottom 11 together with an inclination of the latter or its frustoconical configuration is a structure that is well known in the prior art and is provided to facilitate the shifting of containers 12 towards said peripheral compartments 14. For said motion an assembly has been provided consisting of a motor 39 and a transmission 40 which rotate a shaft 38 supporting said bottom 11. As an aiding means a panel 13 is also employed which has a lower inclined portion determining a tapering of the section for the lateral passage of containers 12 towards compartments 14, in such a way that said containers do already adopt a lying position as they accede to said compartments 14. A ramp of these characteristics is described in the aforementioned patent EP-A-0578602.

According to a first embodiment of the invention, said member 18 for temporarily holding containers 12 consists in a flat 18a forming the bottom of compartment 14 and rotatable at its central part around a cross shaft 23, said flat 18a being selectively tiltable to either side as a result of a rotation of said shaft in the proper direction as dictated by the previous position of container 12 in the compartment.

In the embodiment foreseen in FIGS. 3 and 5 the end sides of compartment 14 are formed by upward extensions 15a, 15b of the flanks of discharge chutes 15, whereas the inner side and bottom of the compartment are respectively formed by the vertical 18b and horizontal 18a flat of an L-shaped plate 18 which at the central part of said vertical flat 18b is connected to said rotary shaft 23, the inner side of the shell, i.e. the extension of wall 10a of hopper 10, delimiting the outer side of said compartment 14.

In the embodiment exemplified in FIG. 6 each compartment consists of an open-bottom frame 35, and member 18 forming the bottom of the compartment has as well a structure of L-shaped cross-section and through a vertical flange 18b superimposed to one of the inner walls of compartment 14 is attached to said rotary shaft 23 centered with respect to the compartment.

Through a first articulated rod 24 and a gearing 25 shaft 23 is connected to a second vertical rod 26 whose lower end is linked to an orthogonal lever 27 ending in a roller 28 that is inserted and guided in a main guide-path 29 which in the exemplified embodiment follows a circular course. Means (piston 31 and switch block 30) have been besides provided which are apt to guide said roller 28 into either of the intermediary guide-path lengths 32, 33 of different course intercalated in said main guide-path 29 thus determining a corresponding rotation of said second vertical rod 26 in either direction and hence also the rotation of rod 24 and finally a proportional rotation of shaft 23 attached to said holding flat or member 18.

As can be appreciated when looking at FIGS. 1 and 3, said compartments 14 are formed at the periphery of a rotary disk 19 to which brackets 34 are fastened for supporting and guiding said first articulated rods 24 which are connected to shaft 23, said gearings 25 directly connected with said first rods 24 being also fastened to said disk, another rotary disk 20 having been provided at a lower level and carrying guiding elements (for example bearings) for a smooth rotation of said vertical rods 26, this latter disk forming with the former rotary disk 19 a support for discharge chutes 15 ending at the bottom on a stationary annular bottom 22 extending into a central platform 22a on which said main guide-path 29 and intermediary guide-path lengths 32 and 33 are defined.

As can be appreciated in FIG. 2, intermediary guide-path lengths 32 and 33 impose a reduction of the diameter of main guide-path 29 in the case of the former and an increase of said diameter in the case of the latter, and hence the travel of roller 28 along either of said path lengths 32, 33 as governed by means 31–30 will cause said lever to turn in one or in the opposite direction covering a turning angle of a preset member of degrees, said turning angle being transmitted by gearing 25, this latter increasing an angle covered by said lever 27 and thus transmitting said increased angle to the first articulated rod 24 with an angular width that is large enough to determine a turning motion of member 18 of enough amplitude to drop (see FIGS. 5 and 6) container 12 in the properly oriented position into discharge chute 15.

As previously indicated FIG. 7 to FIG. 12 show an alternative embodiment where each of compartment reciving articles consists of an open-bottom frame 35 (as the one depictured in FIG. 6), and said member 18 for temporarily holding the articles comprise in this case two planes 41, 42 articulated by one of its edges to opposite ends of the open-bottom frame 35 closing at least in part the passage therethrough, each of said planes 41, 42 being capable to individually pivot and open out while the other remains immobile.

Figure 8:
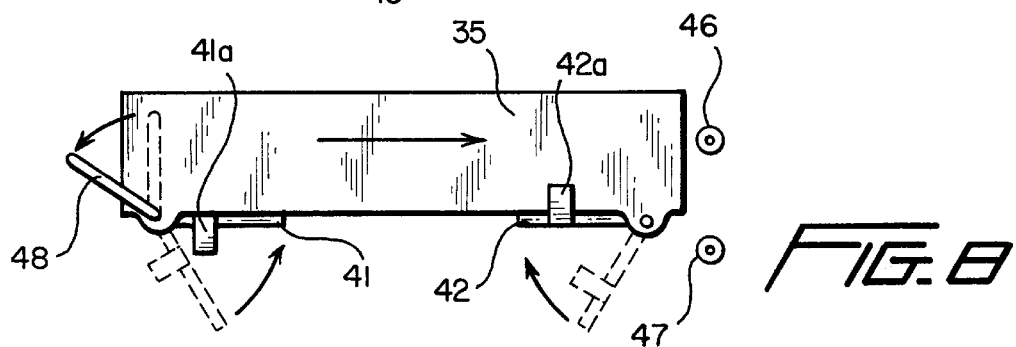
Figure 9:
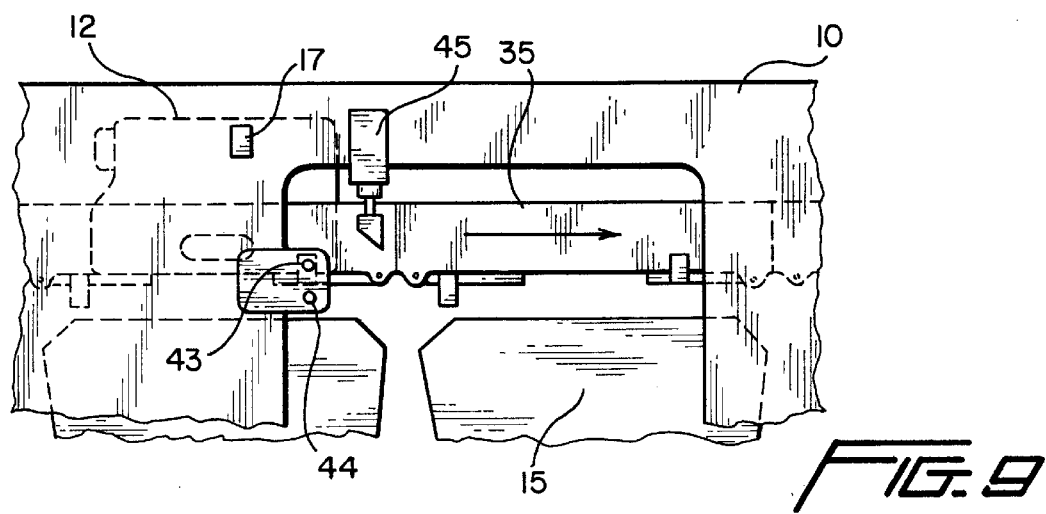
Figure 10:
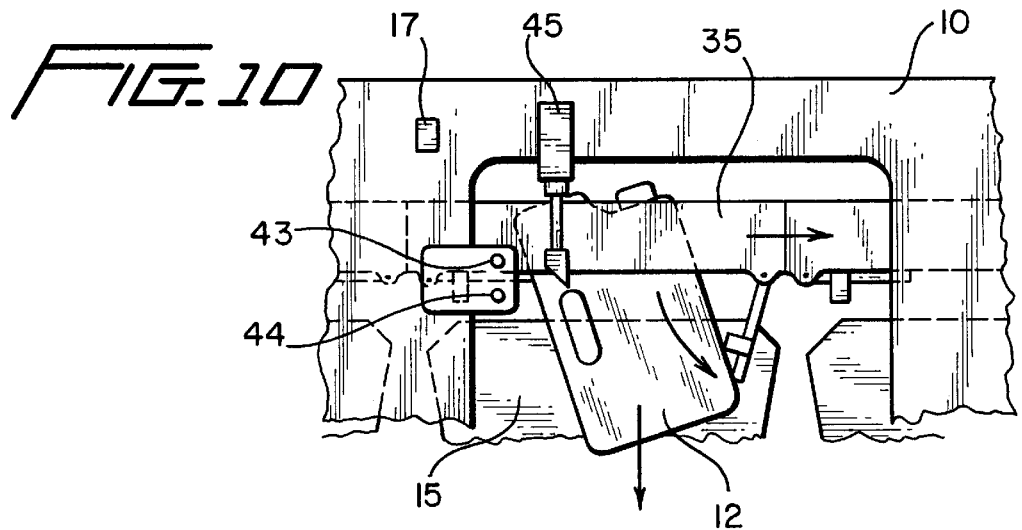

To this aim and as FIG. 7 and FIG. 8 disclose each of said planes 41, 42 include a corresponding projecting member 41a, 42a having a specific orientation with regard to a detector means 43, 44 (such a proximity detector) which they can face along the traveling of the compartment, said detector being secured to the wall of the hopper 10. Besides the planes 41, 42, in a closing position, laterally protrude from said open bottom in such a way they can receive the thrust of an actuator device 45 (i.e. an electro-pneumatically driven pusher) in order to be open out.

The retaining means of said planes 41, 42 in a closing position comprises magnet members (which are not visible in the drawings) connected either to said planes 41, 42 or to some parts of the frame 35 which can enter in contact with said planes 41, 42, both of them of ferromagnetic condition.

As it appears in FIG. 8 return stops 46, 47 have been provided connected to the inner side 10a of the hopper 10 in order to convey to a closing position any one of the planes 41, 42 from its open out position, when the compartment is moving. On purpose the rear plane 41, considered in the moving direction as the compartment travels, includes an elbowed lever 48 extending its articulation axis, in order to collide with mentioned return stop 46.

I claim:

1. An automated unit for the unscrambling and lined up delivery of articles including empty containers or lightweight objects of various configurations, to feed a filling station, comprising:

an upperly open hopper receiving the containers in bulk, said hopper having a flat bottom on which the containers accumulate at random, said bottom having a peripheral edge spaced apart from an inner lateral wall of said hopper thus defining a gap through which said containers can pass;

a plurality of adjacent compartments in motion along a closed circuit below said gap, each of said compartments provided to loosely receive a single container in a lying position;

a discharge chute arranged below each of said compartments and traveling together with each of said compartments to receive said containers as they are positioned as they fall, and subsequent transfer of said containers in a lined up arrangement onto an out feed conveyor;

sensing means for recognising a position adopted by said containers inside said compartments; and tipping means incorporated in each of said compartments for temporarily holding said containers therein, said tipping means including a supporting floor as a bottom in each of said compartments, said floor being selectively tiltable to either side of a middle part thereof by actuation of driving means upon a signal being received from said sensing means, whereby drooping the containers in a conveniently oriented position into said discharge chutes.

2. An automated unit according to claim 1, wherein said flat bottom on which said containers accumulate at random is rotatable to facilitate shifting of said containers towards a peripheral zone thereof.

3. An automated unit, according to claim 1, wherein said flat bottom of said hopper is inclined to facilitate shifting of said containers towards a peripheral zone thereof.

4. An automated unit as claimed in claim 1, wherein said supporting floor is attached to a cross shaft being rotated in a direction according to a position of the container in the compartment as previously detected by said sensing means.

5. An automated unit according to claim 4, wherein:
two end sides of said compartments are formed by upward extensions of two flanks of said discharge chutes, whereas an inner side and the bottom of each compartment are respectively formed by said supporting floor extending in a vertical plane forming an L-shaped plate; a central part of said vertical supporting floor being connected to said rotatable shaft; and said inner lateral wall of said hopper, delimiting an outer side of said compartments.

6. An automated unit according to claim 1, wherein: each compartment comprises an open-bottom frame, and said supporting floor is extended by a vertical plane forming an L-shaped plate;
said vertical supporting floor being superimposed to an inner wall of said open-bottom frame, said vertical supporting floor being attached to said rotary shaft centered with respect to said compartment.

7. An automated unit according to claim 4, wherein:
said rotatable shaft is connected through a first articulated rod and a gearing to a second vertical rod whose lower end is linked to an orthogonal lever ending in a roller that is inserted and guided in a main guide-path forming a closed circuit; and means have been provided for switching said roller into either of intermediary guide-path lengths of different course inserted in said main guide-path thus determining a corresponding rotation of said second vertical rod in either direction and hence a rotation of said first articulated rod and finally a tilting of said supporting floor around a middle part thereof.

8. An automated unit according to claim 7, wherein:
said compartments are formed at a periphery of a first rotary disk to which brackets are fastened for supporting and guiding said first articulated rods which are connected to said rotatable shafts;
said gearing directly connected with said first articulated rod being also fastened to said first disk; and
a second rotary disk integral with said first disc having been provided at a lower level and carrying guiding elements for a rotation of said vertical rods, said second disk forming with said first disk a support for said discharge chutes and ending at the bottom on a stationary annular bottom extending into a central platform on which said main guide-path and intermediary guide-path lengths are defined.

9. An automated unit according to claim 7, wherein said gearing increases an angle covered by said orthogonal level transmitting said orthogonal lever to said first articulated rod.

10. An automated unit according to claim 7, wherein said main guide-path is circumferential, and
said intermediary guide-path lengths comprise arcuate sectors which respectively impose a reduction of diameter of said main guide-path or an increase thereof.

11. An automated machine for the unscrambling and lined up delivery of articles including empty containers of various configurations to be continuously fed to a filling station, comprising:
an upperly open hopper receiving the containers in bulk, said hopper having a flat bottom on which the containers accumulate at random, said bottom having a peripheral edge spaced apart from an inner lateral wall of said hopper thus defining a gap through which containers can pass;
a plurality of adjacent compartments, each of said compartments consists of an open-bottom frame in motion along a closed circuit below said gap, each of said compartments provided to loosely receive a single container in a lying position;
a discharge chute arranged below each compartment and traveling together with each of the compartments to receive the containers as they are positioned as they fall, and subsequent transfer of said containers in a lined up arrangement onto an out feed conveyor;
sensing means for recognising a position adopted by the containers inside said compartments; and
tipping means being incorporated in each compartment for temporarily holding the containers therein;
said tipping means comprise two planes articulated by one of its edges to opposite ends of said open-bottom frame closing at least in part a passage therethrough; and each one of said planes being selectively actuated by driving means upon a signal being received from said sensing means to individually pivot and open out while another of aid planes remains immobile.

12. An automated unit, according to claim 11, wherein: each of said planes incorporate a corresponding projecting member having a specific orientation with regard to a detector means secured to said inner lateral wall of said hopper;
means for retaining said planes in a closing position having been provided; and
said planes laterally protruding from said open bottom in such a way they can receive a thrust of an actuator device in order to open out.

13. An automatic machine, according to claim 12, wherein said means for retaining said planes in a closing position comprises magnet members connected to said planes or to some parts of said frame which can be in contact with said planes, both of them being of ferromagnetic condition.

14. An automatic machine, according to claim 11, wherein:
return stops have been provided connected to said inner lateral wall of said hopper in order to reverse to a closing position any one of said planes opening out when said compartments are in motion;
each rear plane, considered in a moving direction when said compartments are in motion, comprising a lever extending its articulation axis, in order to collide with a corresponding return stop.

* * * * *